(12) United States Patent
Serrell

(10) Patent No.: US 11,413,124 B1
(45) Date of Patent: Aug. 16, 2022

(54) INTEGRATED MANUAL TOOTHBRUSH ASSEMBLY COMPRISING IN INTERIOR DENTAL FLOSS COMPARTMENT

(71) Applicant: David C. Serrell, North Myrtle Beach, SC (US)

(72) Inventor: David C. Serrell, North Myrtle Beach, SC (US)

( * ) Notice: Subject to any disclaimer, the term of this patent is extended or adjusted under 35 U.S.C. 154(b) by 0 days.

(21) Appl. No.: 17/492,242

(22) Filed: Oct. 1, 2021

Related U.S. Application Data

(60) Provisional application No. 63/210,564, filed on Jun. 15, 2021.

(51) Int. Cl.
*A46B 15/00* (2006.01)
*A61C 15/04* (2006.01)

(52) U.S. Cl.
CPC ........ *A61C 15/043* (2013.01); *A46B 15/0061* (2013.01); *A61C 15/041* (2013.01); *A46B 15/0071* (2013.01)

(58) Field of Classification Search
CPC ............ A46B 15/0061; A46B 15/0071; A46B 15/0055; A46B 15/0073; A45D 44/18; A61C 15/043; A61C 15/04
USPC .......................... 132/309, 311, 324, 325, 308
See application file for complete search history.

(56) References Cited

U.S. PATENT DOCUMENTS

| | | | | |
|---|---|---|---|---|
| 5,105,840 A | * | 4/1992 | Giacopuzzi | A61C 15/046 132/325 |
| 5,566,872 A | * | 10/1996 | Dolan | A61C 15/043 225/41 |
| 5,607,050 A | * | 3/1997 | Dolan | A61C 15/043 206/408 |
| 6,325,076 B1 | * | 12/2001 | Ramirez | A46B 11/002 132/308 |
| 7,267,126 B1 | * | 9/2007 | Banegas | A46B 15/0091 132/309 |
| 7,987,861 B2 | * | 8/2011 | Grosse | A61C 15/043 132/325 |
| 9,498,311 B2 | * | 11/2016 | Kelchlin | A45D 40/18 |
| 10,709,531 B1 | * | 7/2020 | Urso | A61C 15/04 |
| 2005/0211263 A1 | * | 9/2005 | Kuo | A45D 44/18 132/309 |
| 2006/0086369 A1 | * | 4/2006 | Wilkinson | A46B 15/0071 132/309 |
| 2012/0138082 A1 | * | 6/2012 | Pardue | A46B 7/04 132/309 |

* cited by examiner

*Primary Examiner* — Tatiana L Nobrega
(74) *Attorney, Agent, or Firm* — Dogwood Patent and Trademark Law; Ashley D. Johnson

(57) ABSTRACT

The invention is directed to a manual toothbrush that includes an interior compartment housing an amount of dental floss. The toothbrush comprises a handle defined by an interior compartment. A portion of dental floss is housed within the interior compartment. The handle includes a cap that allows access to the dental floss housed within the interior compartment. The handle can include one or more finger or thumb rests that provide comfort to the user while brushing their teeth and/or accessing the interior compartment. The toothbrush also comprises an angled brush head defined by a plurality of bristles. Advantageously, the toothbrush allows for brushing and flossing using one compact and convenient device.

18 Claims, 13 Drawing Sheets

INTEGRATED MANUAL TOOTHBRUSH ASSEMBLY COMPRISING IN INTERIOR DENTAL FLOSS COMPARTMENT

CROSS-REFERENCE TO RELATED APPLICATIONS

This application claims priority to U.S. Provisional Patent Application No. 63/210,564 filed Jun. 15, 2021, the entire content of which is hereby incorporated by reference.

TECHNICAL FIELD

The presently disclosed subject matter is generally directed to an integrated manual toothbrush assembly comprising an interior dental floss compartment.

BACKGROUND

Oral hygiene is a measurement of the cleanliness of a person's teeth, gums, and mouth. Good oral hygiene diminishes dental plaque and tartar build-up which can cause cavities, gingivitis, premature tooth decay, and/or gum disease. Good oral hygiene includes consistent tooth brushing and flossing in addition to regular visits to a dentist for professional cleaning and general oral care. While regular tooth brushing is known to alleviate tartar build-up, brushing alone is not effective at removing tartar from between individual teeth. Therefore, flossing is essential to clean the hard-to-reach areas in between individual teeth. Despite the well-known advantages, many individuals do not use dental floss on a regular basis due to its lack of convenience. Specifically, toothpaste and toothbrushes are primarily stored in the open area around a sink area, while dental floss is commonly kept in a bathroom drawer or otherwise out of sight. Because it is not immediately accessible, many users will simply forget to use dental floss. Other users do not wish to take the additional step of locating the dental floss and using it.

There have been several attempts to combine toothbrushes and dental floss into a single assembly. However, these prior art devices suffer from several drawbacks. For example, prior attempts have produced assemblies that are generally cumbersome, with user difficulty accessing and using the dental floss. Other attempts have resulted in uncomfortable toothbrushes that are not easily or securely gripped during use. It would therefore be beneficial to provide a manual toothbrush that includes dental floss within an interior compartment, thereby promoting consistent and regular use.

SUMMARY

In some embodiments, the presently disclosed subject matter is directed to a manual toothbrush. The toothbrush comprises a brush head comprising a first face and an opposed second face, wherein the first face is defined by a plurality of bristles. The toothbrush further includes a handle defined by a first end, a second end, and a body therebetween, wherein the first end of the handle is operably connected to the brush head and the second end of the handle comprises a removable cap. The handle includes an interior compartment positioned within the inside of the body, wherein the interior compartment comprises a first end defined by a first protrusion that extends into the interior compartment and a second end that is adjacent to the removable cap. The handle includes a platform insert positioned adjacent to the interior compartment second end, the insert defined by a top face comprising a depression that includes a housing comprising an interior channel that in communication with the interior compartment, and a cutting element, wherein the platform insert further includes a bottom face comprising a second protrusion that extends into the interior compartment, wherein the housing extends above the top face of the platform insert. A bore is positioned between the first and second protrusions within the interior compartment.

In some embodiments, the toothbrush further includes a spool wound with dental floss positioned about the bore.

In some embodiments, the dental floss comprises an end that extends from the spool through the housing interior channel.

In some embodiments, the handle body comprises one or more concave thumb or finger rests.

In some embodiments, the removable cap is a flip cap that moves from a first position to a second position to allow access to the platform insert.

In some embodiments, the first and second ends of the bore each comprise a cavity sized and shaped to accommodate the first or second protrusion.

In some embodiments, the brush head is angled relative to the handle.

In some embodiments, the spool comprises an interior passageway with a diameter that is greater than an external diameter of the bore.

In some embodiments, the bore can rotate about the first and second protrusions.

In some embodiments, the cap includes an interior face adjacent to the interior compartment, wherein the interior face comprises an extension that cooperates with a cleft positioned on the top face of the platform insert.

In some embodiments, the height of the platform insert housing is about 0.25-1 inch.

In some embodiments, the platform insert housing extends above the top face of the platform insert.

In some embodiments, the presently disclosed subject matter is directed to a method of flossing the teeth. The method comprises opening the cap of a manual toothbrush to access a platform insert. The manual toothbrush is defined by a brush head comprising a first face and an opposed second face, wherein the first face is defined by a plurality of bristles. The toothbrush also includes a handle defined by a first end, a second end, and a body therebetween, wherein the first end of the handle is operably connected to the brush head and the second end of the handle comprises a removable cap. The handle includes an interior compartment positioned within the inside of the body, wherein the interior compartment comprises a first end defined by a first protrusion that extends into the interior compartment and a second end that is adjacent to the removable cap. The toothbrush includes a platform insert positioned adjacent to the interior compartment second end, the platform insert defined by a top face comprising a depression that includes a housing comprising an interior channel that in communication with the interior compartment, and a cutting element, wherein the platform insert further includes a bottom face comprising a second protrusion that extends into the interior compartment. The housing extends above the top face of the platform insert. The toothbrush includes a bore positioned between the first and second protrusions within the interior compartment. The method comprises grasping a portion dental floss that extends from the platform insert housing, and pulling additional dental floss from the interior compartment, thereby unwinding the dental floss from the spool.

The method includes cutting a portion of dental floss using the cutting element and using the portion of dental floss to floss the teeth.

In some embodiments, the method includes moving the cap to the closed position.

In some embodiments, the handle body comprises one or more concave thumb or finger rests.

In some embodiments, the first and second ends of the bore each comprise a cavity sized and shaped to accommodate the first or second protrusion.

In some embodiments, the spool comprises an interior passageway with a diameter that is greater than an external diameter of the bore.

In some embodiments, the brush head is angled relative to the handle.

In some embodiments, the height of the platform insert housing is about 0.25-1inch.

In some embodiments, the platform insert housing extends above the top face of the platform insert.

DETAILED DESCRIPTION

Figure 1:
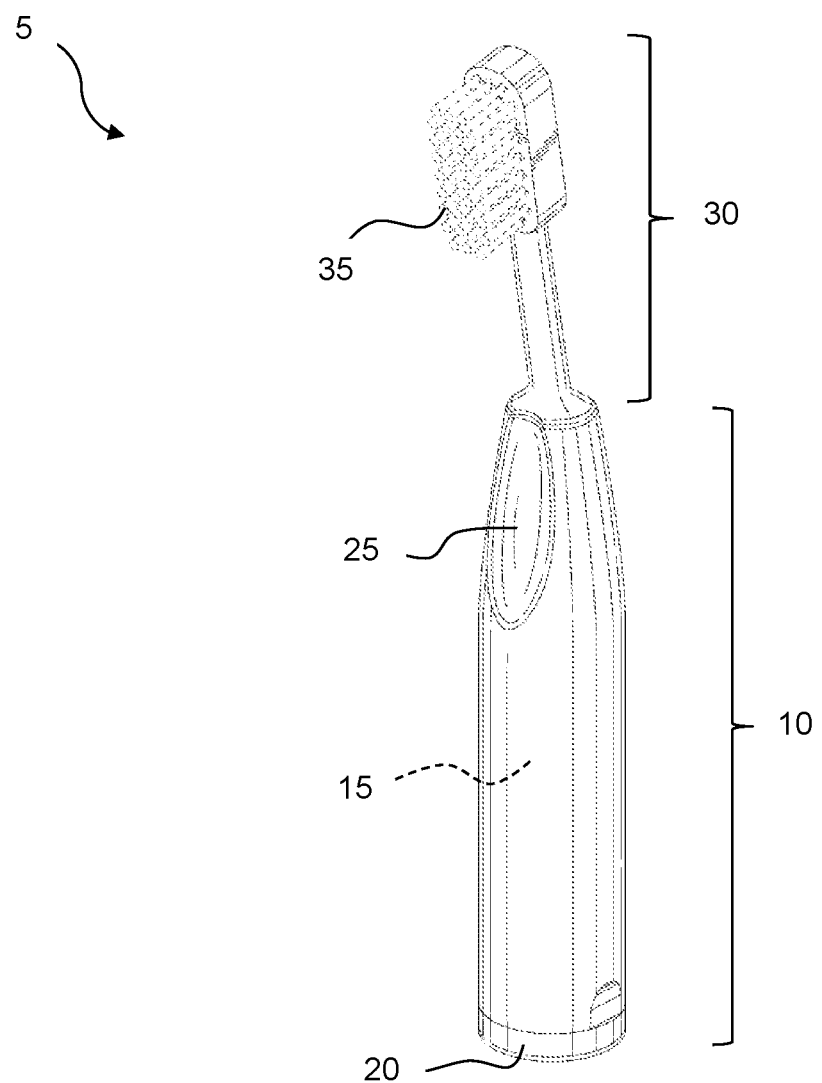
FIG. 1 is a perspective view of manual toothbrush assembly comprising an interior dental floss compartment in accordance with some embodiments of the presently disclosed subject matter.

The presently disclosed subject matter is introduced with sufficient details to provide an understanding of one or more particular embodiments of broader inventive subject matters. The descriptions expound upon and exemplify features of those embodiments without limiting the inventive subject matters to the explicitly described embodiments and features. Considerations in view of these descriptions will likely give rise to additional and similar embodiments and features without departing from the scope of the presently disclosed subject matter.

Unless defined otherwise, all technical and scientific terms used herein have the same meaning as commonly understood to one of ordinary skill in the art to which the presently disclosed subject matter pertains. Although any methods, devices, and materials similar or equivalent to those described herein can be used in the practice or testing of the presently disclosed subject matter, representative methods, devices, and materials are now described.

Following long-standing patent law convention, the terms "a", "an", and "the" refer to "one or more" when used in the subject specification, including the claims. Thus, for example, reference to "a device" can include a plurality of such devices, and so forth. It will be further understood that the terms "comprises," "comprising," "includes," and/or "including" when used herein specify the presence of stated features, integers, steps, operations, elements, and/or components, but do not preclude the presence or addition of one or more other features, integers, steps, operations, elements, components, and/or groups thereof.

Unless otherwise indicated, all numbers expressing quantities of components, conditions, and so forth used in the specification and claims are to be understood as being modified in all instances by the term "about". Accordingly, unless indicated to the contrary, the numerical parameters set forth in the instant specification and attached claims are approximations that can vary depending upon the desired properties sought to be obtained by the presently disclosed subject matter.

As used herein, the term "about", when referring to a value or to an amount of mass, weight, time, volume, concentration, and/or percentage can encompass variations of, in some embodiments +/−20%, in some embodiments +/−10%, in some embodiments +/−5%, in some embodiments +/−1%, in some embodiments +/−0.5%, and in some embodiments +/−0.1%, from the specified amount, as such variations are appropriate in the disclosed packages and methods.

As used herein, the term "and/or" includes any and all combinations of one or more of the associated listed items.

Relative terms such as "below" or "above" or "upper" or "lower" or "horizontal" or "vertical" may be used herein to describe a relationship of one element, layer, or region to another element, layer, or region as illustrated in the drawing figures. It will be understood that these terms and those discussed above are intended to encompass different orientations of the device in addition to the orientation depicted in the drawing figures.

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

The presently disclosed subject matter is generally directed to a manual toothbrush that includes an interior compartment housing an amount of dental floss. FIG. 1 illustrates one embodiment of manual toothbrush 5 comprising handle 10 defined by interior compartment 15. A portion of dental floss is housed within the interior compartment. Particularly, the handle includes cap 20 that allows access to the dental floss housed within the interior compartment, as described in more detail herein below. The handle can include one or more finger or thumb rests 25 that provide comfort to the user while brushing their teeth and/or accessing the interior compartment. Toothbrush 5 also comprises angled brush head 30 defined by a plurality of bristles 35. Advantageously, the toothbrush allows for brushing and flossing using one compact and convenient device.

Figure 2:
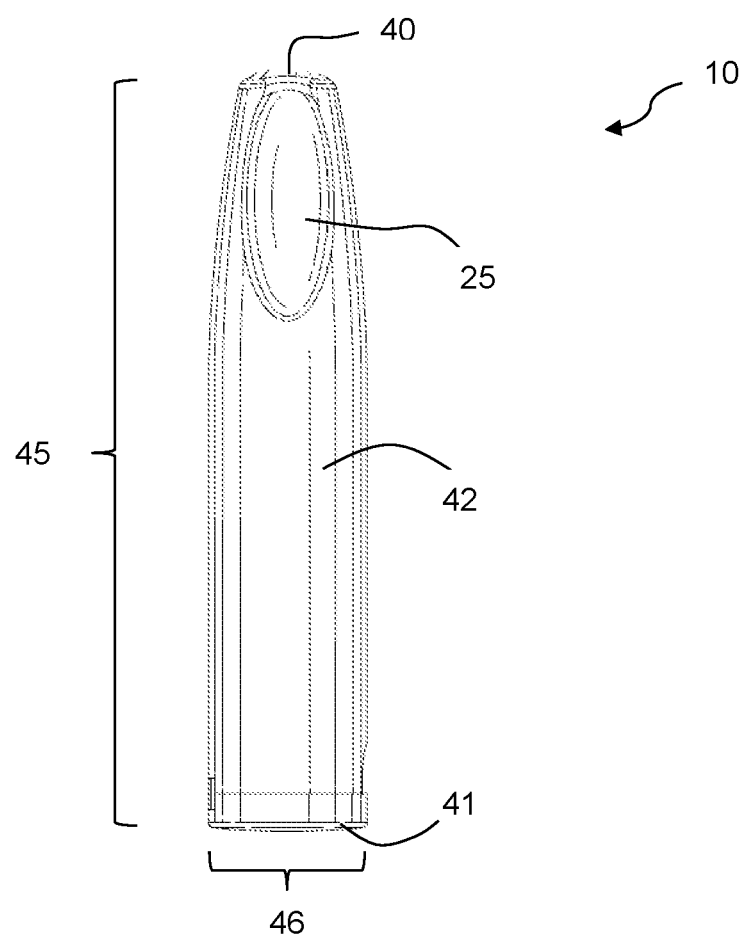
FIG. 2 is a perspective view of a manual toothbrush handle comprising an interior dental floss compartment in accordance with some embodiments of the presently disclosed subject matter.

As noted above, toothbrush 5 includes handle 10 that allows the user to grip the toothbrush during use. The term "handle" refers to a graspable region of the toothbrush that a user can grip or otherwise manipulate to guide the toothbrush head. The handle includes distal end 40 that is in direct contact with brush head 30, proximal end 41, and elongate body 42 therebetween, as shown in FIG. 2. Proximal end 41 can include a lower horizontal edge, allowing the toothbrush to rest on a support surface, such as a bathroom counter.

Handle 10 is configured to accommodate a user's grip during a brushing and/or flossing session. To provide sufficient grasping capability, handle 10 will generally have length 45 of about 3-10 inches (e.g., at least/no more than about 3, 3.5, 4, 4.5, 5, 5.5, 6, 6.5, 7, 7.5, 8, 8.5, 9, 9.5, or 10 inches). The term "length" refers to the longest vertical distance between the proximal and distal ends of the toothbrush assembly. Handle 10 can further include width 46 of about 0.5-2 inches (e.g., at least/no more than about) 0.5, 1, 1.5, or 2 inches). The term "width" refers to the longest horizontal length from a first side to a second side of the handle. It should be appreciated that although ranges are given herein, the disclosed toothbrush is not limited and can be configured with a length and/or width outside the given ranges.

Handle 10 is advantageously shaped to be comfortably used. To this end, the toothbrush handle can have any desired cross-sectional shape, such as (but not limited to) circular, oval, square, rectangular, triangular, pentagonal, hexagonal, octagonal, and the like.

Figure 3:
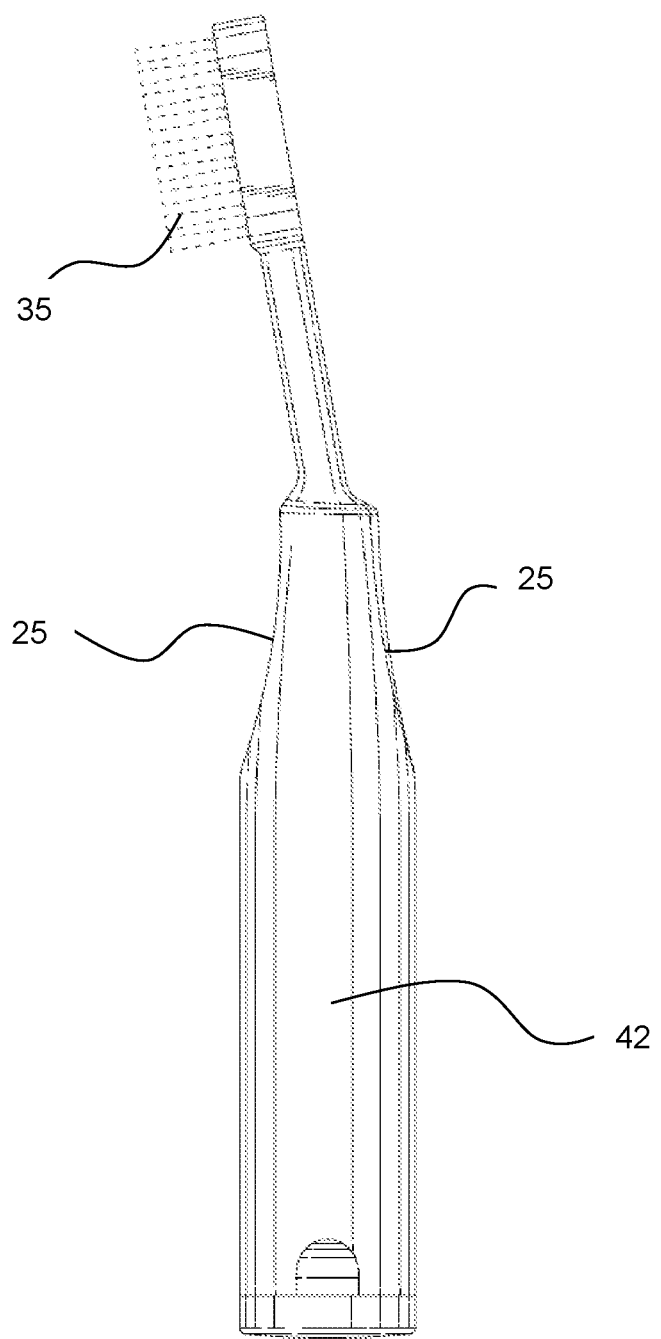
FIG. 3 is a side plan view of a manual toothbrush comprising a series of rests in accordance with some embodiments of the presently disclosed subject matter.

Body 42 of the handle has an ergonomic shape that fits comfortably in the hand of the user during brushing and removal of dental floss from compartment 15. In some embodiments, the handle can include one or more rests 25 sized and shaped to support a user's fingers and/or thumb. For example, the rests can be concave in shape, as shown in FIG. 3. The rests can provide a textured surface, allowing the user to grip handle more easily and stably. The rests can further provide an added layer of comfort for the user during use. Rests 25 can be constructed from any desired material, such as rubber, plastic, latex, and the like to provide a non-slip characteristic to the handle.

Figure 4A:
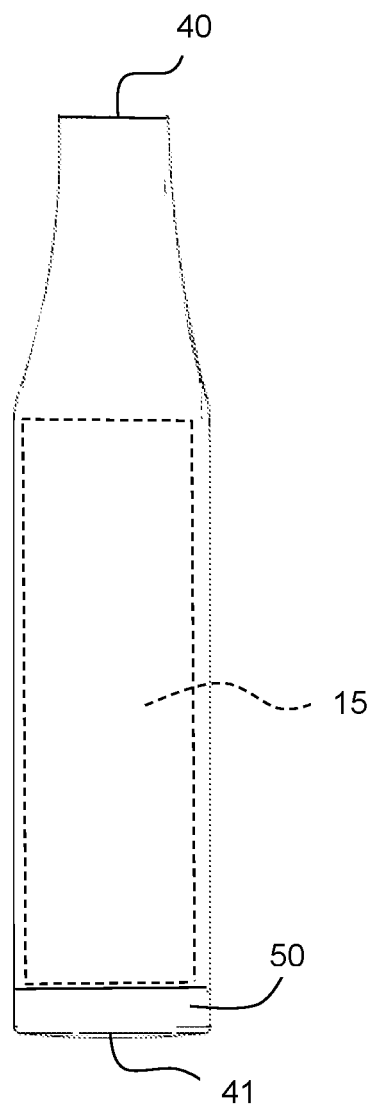
FIG. 4a is a cross-sectional view of a manual toothbrush handle comprising an interior dental floss compartment and corresponding cap in accordance with some embodiments of the presently disclosed subject matter.
Figure 4B:
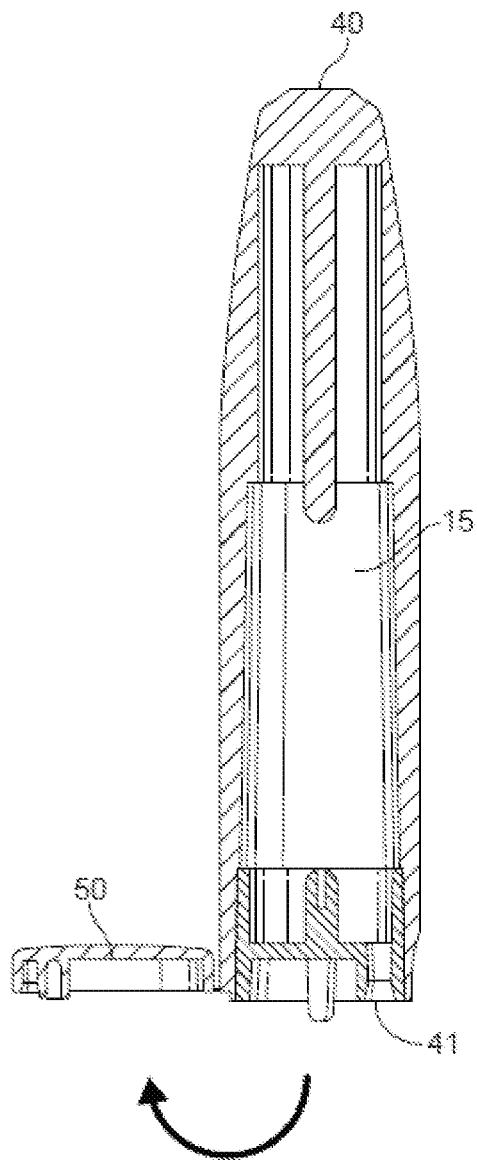
FIG. 4b is a cross-sectional view of the manual toothbrush handle of FIG. 4a with the cap in an opened configuration in accordance with some embodiments of the presently disclosed subject matter.
Figure 4C:
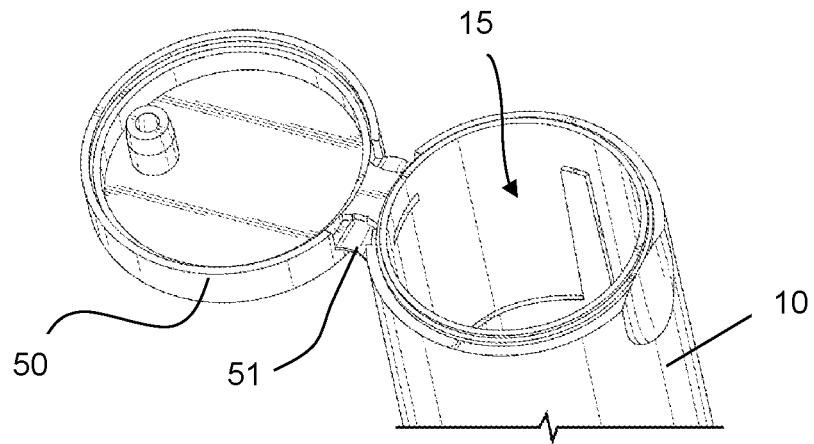
FIG. 4c is a fragmentary perspective view of a toothbrush interior compartment cap in accordance with some embodiments of the presently disclosed subject matter.

The handle includes cap 50 that can be removed or maneuvered to allow access to internal compartment 15. The term "cap" broadly refers to any element that allows selective access to the interior compartment of toothbrush 5. Thus, in some embodiments, cap 50 can have a first, closed position as shown in FIG. 4a. The cap can further have a second, open position as illustrated in FIGS. 4b and 4c. Specifically, the cap can hinge or swing open to allow a user to access interior compartment 15, such as to retrieve a portion of dental floss from a supply housed within the handle. Thus, the cap can be connected to the handle body using one or more hinges 51 to allow pivotal rotation of the cap to selectively open and close the interior compartment. For example, the cap can be opened to remove a portion of dental floss from the cavity of the interior compartment. Alternatively, the cap can be attached to the handle body using any conventional mechanism, such as the use of screw threads, magnets, snap-fit attachment, sliders, clips, nuts, bolts, fasteners, and the like.

In some embodiments, removable end cap 50 tightly cooperates with the proximal end of toothbrush 5 so as to be water resistant. In this way, the disclosed toothbrush can be rinsed under a faucet without water getting into interior compartment 15, thereby keeping the dental floss housed therein dry. Thus, the interior compartment can be waterproof and/or watertight. The term "waterproof" refers to the characteristic of not allowing water to pass in the absence of external pressure. The term "watertight" refers to the ability to repel water such that no water can pass through.

Figure 5:
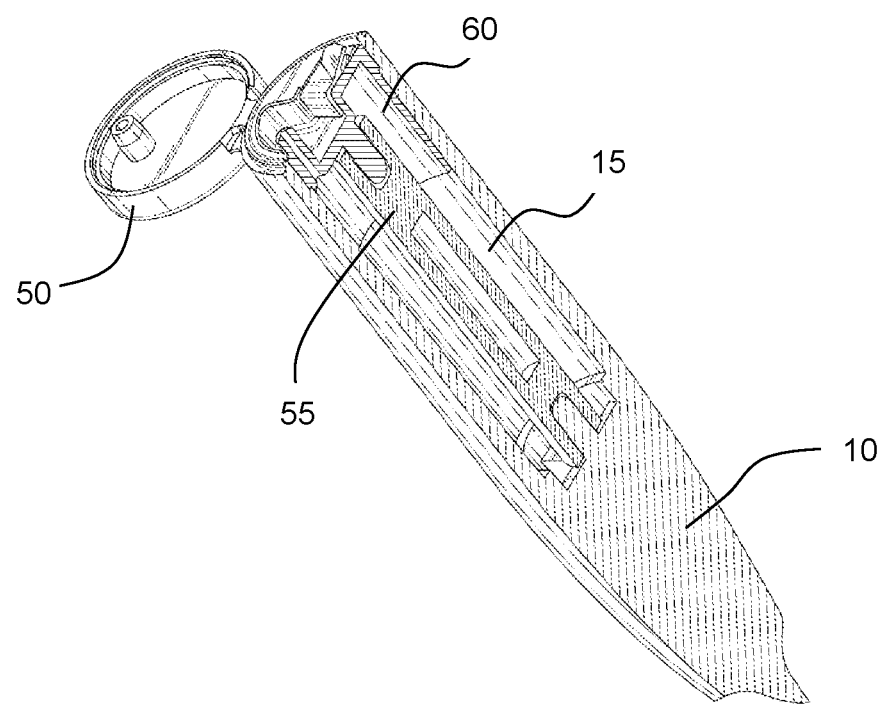
FIG. 5 is a cross-sectional perspective view of a handle interior compartment comprising a bore and a platform insert in accordance with some embodiments of the presently disclosed subject matter.

Interior compartment 15 comprises an internal space sized and shaped to accommodate internal bore 55 about which a spool of dental floss is inserted and retained. The interior compartment further includes platform insert 60 which facilitates access and use of the dental floss by the user, as shown in FIG. 5. The platform insert further cooperates with the cap to maintain the closed position when the dental floss is not in use.

Figure 6A:
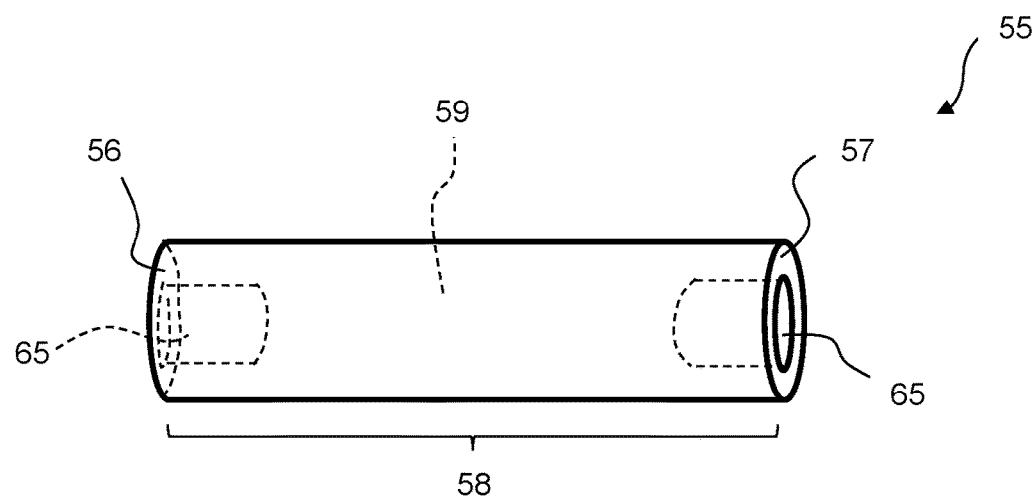
FIG. 6a is a perspective view of a bore in accordance with some embodiments of the presently disclosed subject matter.

Therefore, the interior compartment of toothbrush 5 includes spool-retaining dental floss bore 55 sized to longitudinally receive a spool wound with dental floss. FIG. 6a illustrates one embodiment of bore 55 comprising first and second ends 56, 57 and length 58 therebetween. As shown, the bore includes openings 65 positioned at the top and bottom ends that extend partially into bore interior 59 to create a pair of cavities that receive a first protrusion in the top face of interior compartment and a second protrusion on a bottom surface of a corresponding platform insert.

Figure 6B:
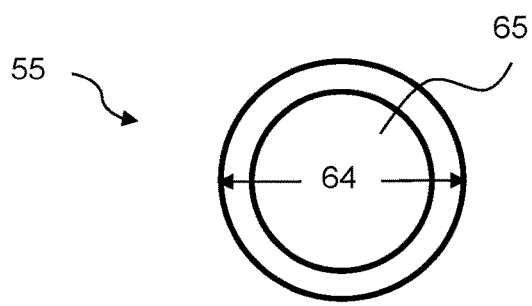
FIG. 6b is a cross-sectional view of a bore comprising a diameter in accordance with some embodiments of the presently disclosed subject matter.

The bore is sized and shaped to receive floss spool 61 around which a supply of dental floss 62 is wound. For example, in some embodiments, bore length 58 can be about 1-5 inches (e.g., at least/no more than about 1, 2, 3, 4, or 5 inches). The bore can further comprise external diameter 64 of about 0.25-2 inches (e.g., at least/no more than about 0.25, 0.5, 0.75, 1, 1.25, 1.5, 1.75, or 2 inches). The term "diameter" refers to the longest horizontal straight line passing from side to side through the center of the bore, as shown in FIG. 6b. Spool 61 is therefore free to rotate about bore 55. It should be appreciated that the ranges given for the bore length and diameter are not intended to be limiting and are included as an example of some embodiments of the bore.

Figure 6C:
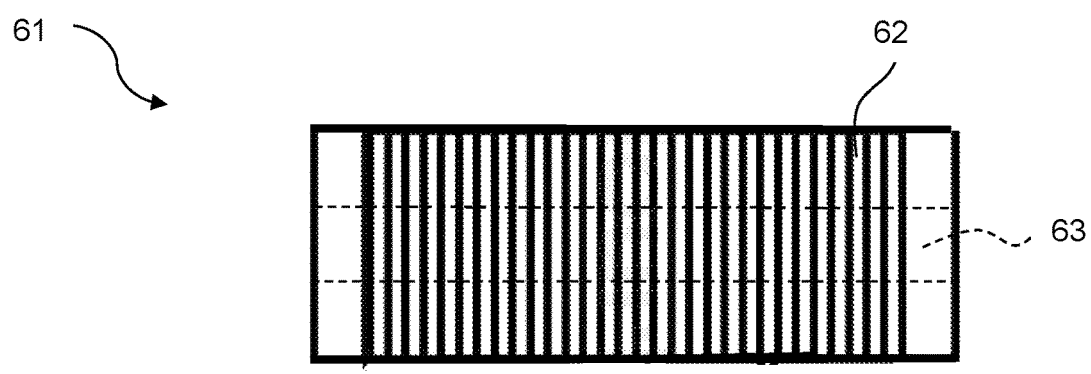
FIG. 6c is a side plan view of a dental floss spool in accordance with some embodiments of the presently disclosed subject matter.
Figure 6D:
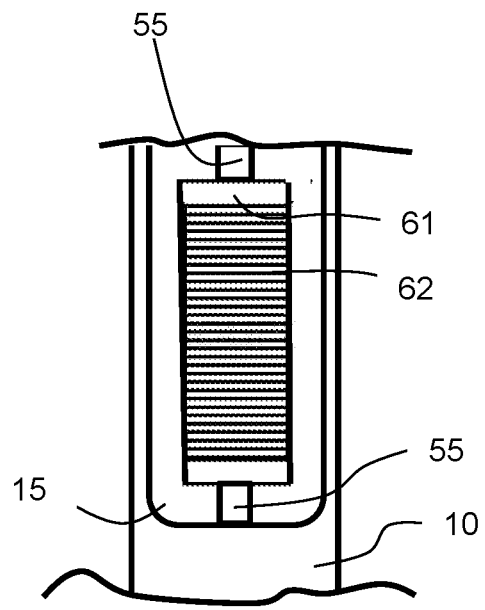
FIG. 6d is a cross-sectional view of a toothbrush interior compartment comprising a bore and a spool wound with dental floss in accordance with some embodiments of the presently disclosed subject matter.

One embodiment of a conventional floss spool is illustrated in FIG. 6c. The spool includes internal passageway 63 that extends along the length of the spool. The internal passageway is sized to accommodate bore 55 (e.g., the diameter of the internal passageway is greater than external bore diameter 64). In this way, spool 61 can be retained by bore 55 within the handle interior compartment. The wound dental floss therefore extends about length 58 when the spool is installed on the bore, as shown in FIG. 6d.

The spool includes a portion of wound dental floss 62, which can be of any desired length. For example, the spool can include about 50 yards of dental floss (e.g., at least/no more than about 25-75 yards). Any type of conventional dental floss can be used with spool 61, such as waxed, unwaxed, flavored, unflavored, and the like.

Figure 7A:
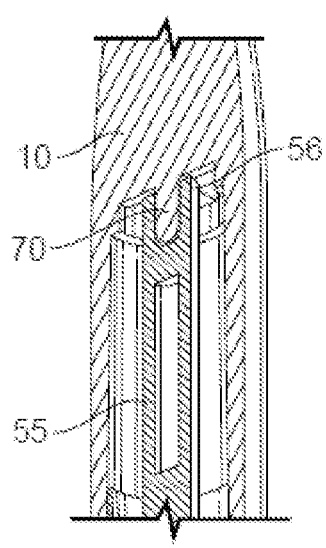
FIG. 7a is a cross-sectional perspective view of a handle interior compartment comprising a bore in accordance with some embodiments of the presently disclosed subject matter.
Figure 7B:
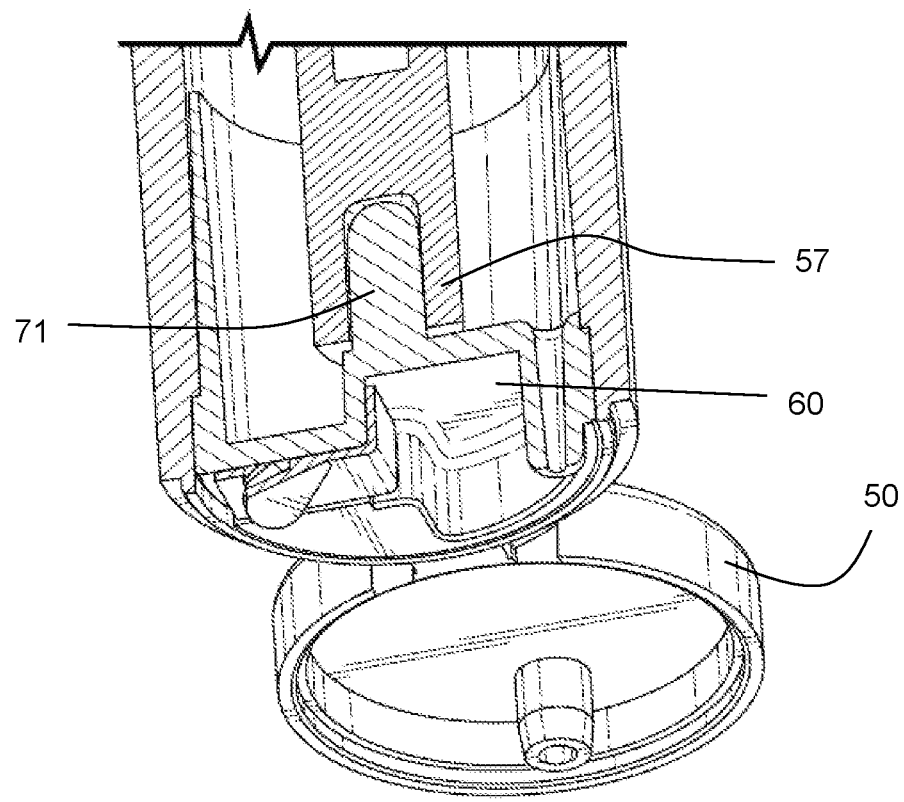
FIG. 7b is a cross-sectional perspective view of a handle interior compartment comprising a bore and a platform insert in accordance with some embodiments of the presently disclosed subject matter.

FIG. 7a illustrates one embodiment of interior compartment 15 comprising first protrusion 70 configured on the distal end of the compartment (e.g., opposing the cap end). Protrusion 70 is sized and shaped to be received within bore opening 65 and the corresponding cavity at first bore end 56. In this way, the first end of the bore remains properly positioned within the interior compartment. Similarly, the cavity configured at second bore end 57 is sized and shaped to receive second protrusion 71 positioned on a interior compartment-facing surface of platform insert 60, as shown in FIG. 7b. Because first and second protrusions 70, 71 are each secured within a cavity positioned at a respective end of bore 55, the bore is secured in place within the interior handle compartment.

In some embodiments, the bore can rotate about the first and second protrusions, such as when a user removes a portion of dental floss, as discussed below.

Figure 8A:
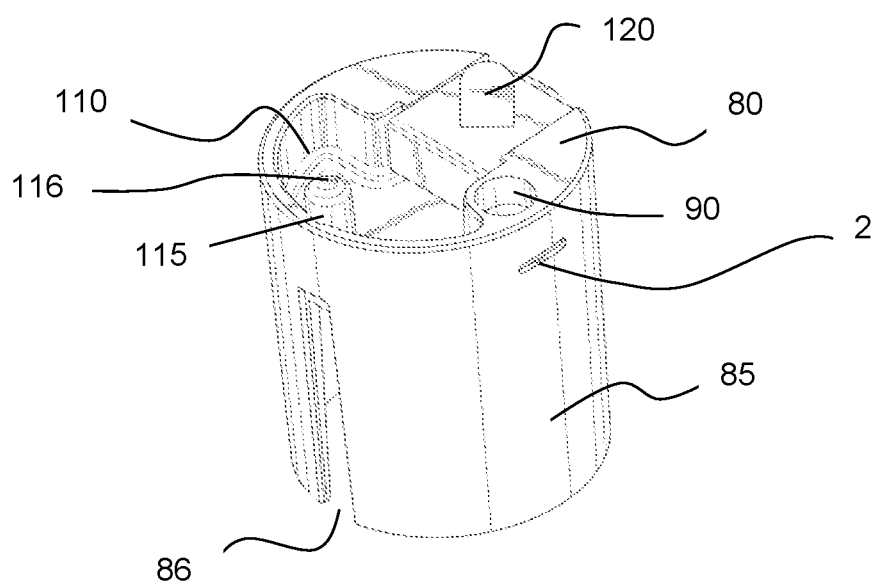
FIG. 8a is a perspective view of a manual toothbrush platform insert in accordance with some embodiments of the presently disclosed subject matter.
Figure 8B:
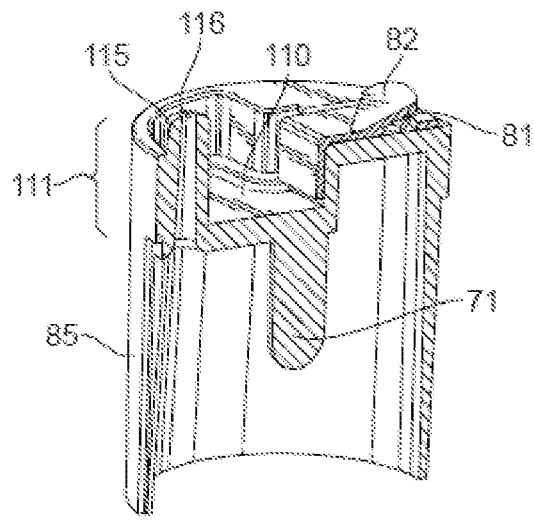
FIG. 8b is a cross-sectional view of a manual toothbrush platform insert in accordance with some embodiments of the presently disclosed subject matter.

FIGS. 8a and 8b illustrate one embodiment of platform insert 60 that can be used with handle 10, fitting between bore 55 and cap 50. As shown, the platform insert includes top platform insert first face 80 and sidewall 85 with open bottom that forms an interior space. Sidewall 85 can include one or more slits 86 that cooperate with corresponding ridges positioned on the surface of interior compartment 15. The sidewall also includes a pair of openings 2 that cooperates with a corresponding ridge on the interior of the interior compartment. In this way, the platform insert is properly positioned, frictionally held within the interior compartment, and cannot rotate or move. It should be appreciated that any mechanism can be used to permanently or releasably retain the platform insert within the compartment 15. The interior of the platform insert includes second protrusion 71, as discussed above.

Figure 8C:
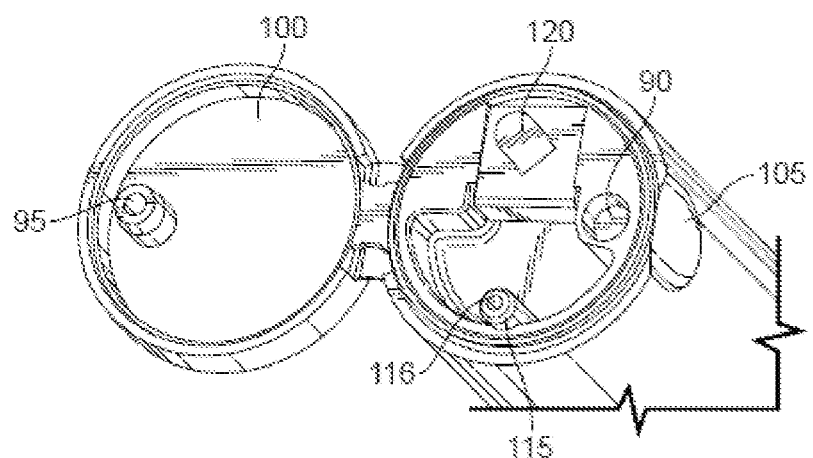
FIG. 8c is a perspective view of a top face of a manual toothbrush platform insert in accordance with some embodiments of the presently disclosed subject matter.

Top platform insert first face 80 comprises cleft 90 that is sized and shaped to cooperate with extension 95 configured on inside cap surface 100, as illustrated in FIG. 8c. The cleft can therefore have a diameter slightly less than the diameter of extension 95 to maintain the cap in a closed position. However, it should be appreciated that any closure mechanism can be used to releasably maintain the extension within cleft 90, such as pressure-fit closure, magnets, fasteners, and the like. In some embodiments, the outer surface of handle 10 can include notch 105 positioned adjacent to cap 50. The notch functions to open the cap to provide access to platform insert 60 (and thus dental floss 62). However, any element that can open and close cap 50 can be used.

As shown in FIGS. 8a-8c, the top face of platform insert 60 also includes depression 110 comprising dental floss housing 115. The housing provides an exit for dental floss being unwound from spool 61 (e.g., dental floss 62 is unwound from the spool and exits the interior compartment of the handle through aperture 116 of housing 115). As shown, housing 115 has a height that extends above the platform insert top surface to provide sufficient gripping area to allow a user to grasp dental floss that extends from aperture 116. Thus, the combination of depression 110 and the height of housing 115 allows a user to easily grasp dental floss 62 for use.

In some embodiments, lateral distance 111 from the top of housing 115 to the bottom of depression 110 can be about 0.5-1 inches (e.g., at least/no more than about 0.5, 0.6, 0.7, 0.8, 0.9, or 1 inch). However, the distance 111 can be greater or less than the range given herein.

In some embodiments, housing 115 can extend about 0.1-0.5 inches above the top platform insert first face 80 of the platform insert (e.g., at least/no more than about 0.1, 0.2, 0.3, 0.4, or 0.5 inches). However, the presently disclosed subject matter is not limited to the range given herein and can be greater or less than the values given.

Dental floss cutter 120 is also positioned on top platform insert first face 80 of the platform insert. The floss cutter can be constructed from steel or any other sharp rigid material with sufficient sharpness. The cutter can include cutting element 81 (e.g., blade) and protective shield 82 that acts as a guide and prevents the likelihood of user contact with the cutting element.

In some embodiments, platform insert 60 can be constructed from a transparent material (e.g., a clear plastic material) to allow the user to see interior compartment 15 and determine the amount of dental floss remaining on the spool. It should be appreciated that other mechanisms can be used to provide an indication of the status of the dental floss, such as a window or slot.

In some embodiments, platform insert 60 can be easily removed by a user to allow removal and/or replacement of the dental floss spool when needed. Thus, spool 61 can be replaceable, allowing the user to keep toothbrush 5 for an extended period of time if desired. The user can simply purchase an additional dental floss spool and affix it to bore 55. The presently disclosed subject matter also includes embodiments wherein the entire toothbrush is disposable after the bristles wear out and/or the dental floss supply is exhausted.

Figure 9A:
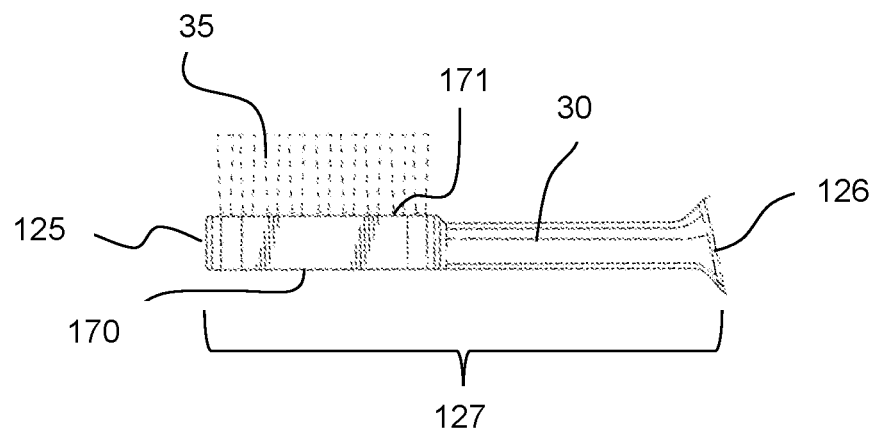
FIG. 9a is a side plan view of a brush head that can be used with a manual toothbrush in accordance with some embodiments of the presently disclosed subject matter.

As described above, toothbrush 5 further comprises brush head 30 comprising first face 170 and opposed second face 171 comprising series of bristles 35, as shown in FIG. 9a. The brush head comprises distal end 125, proximal end 126, and length 127 therebetween. In some embodiments, the brush head length can be about 1-4 inches (e.g., at least/no more than about 1, 1.5, 2, 2.5, 3, 3.5, or 4 inches). However, length 127 is not limited to the range given herein.

Figure 9B:
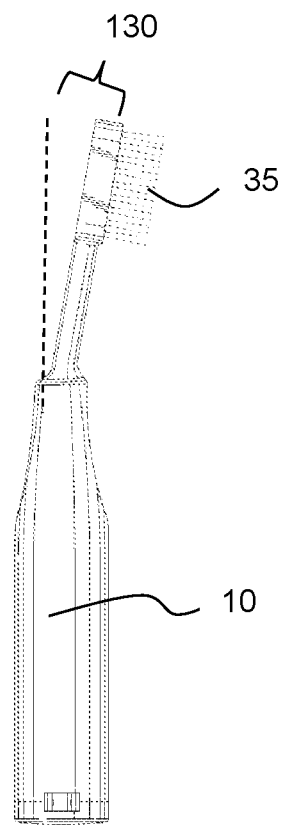
FIG. 9b is a side plan view of a manual toothbrush in accordance with some embodiments of the presently disclosed subject matter.

In some embodiments, brush head 30 can be angled relative to handle 10, as shown in FIG. 9b. For example, angle 130 can be about 5-60 degrees relative to the handle or laterally. Thus, angle 130 can be at least about (or no more than about) 5, 10, 15, 20, 25, 30, 35, 40, 45, 50, 55, or 60 degrees. However, the disclosed angle is not limited and can be configured outside the range given herein. Advantageously, the angled brush head allows the user to maneuver the bristles more easily and efficiently in their mouth while brushing their teeth.

In some embodiments, brush head 30 can be permanently attached to distal end 40 of the handle. However, the presently disclosed subject matter also includes embodiments wherein the brush head is detachable from handle 10, thereby allowing a user to replace the brush head when the bristles become worn.

Bristles 35 can be constructed from any of a wide variety of materials, such as (but not limited to) nylon, polyester, and the like. Bristles 35 can all have about the same height or can vary in height to reach uneven surfaces of the teeth. The bristles can be soft, medium, or firm to accommodate a variety of user preferences.

The disclosed toothbrush can be constructed from any suitable material, such as (but not limited to) metal (e.g., stainless steel, aluminum, copper), plastic (polypropylene), wood, or combinations thereof. In some embodiments, handle 10 and brush head 30 can be constructed from the same material. However, the presently disclosed subject matter also includes embodiments wherein the brush head and handle are constructed from different materials.

Toothbrush 5 can be constructed in any of a wide variety of colors or combination of colors. Further, the toothbrush can include any desired patterns (e.g., stripes), wording, logos, or other ornamental features.

Although several size ranges have been disclosed herein, the toothbrush can be sized for different users. For example, the size of handle 10 and/or brush head 30 can be scaled up or down in size to accommodate both adults and children. Further, the shape of the handle can be designed for right-handed and left-handed users.

The handle and brush head can be constructed using any conventional mechanism, such as thermoforming, welding, injection molding, over-molding, tooling, and the like. In some embodiments, the handle and brush head are constructed as a single, unitary toothbrush. In other embodiments, the brush head and handle can be constructed separately and permanently or releasably coupled together using conventional mechanisms.

Figure 10:
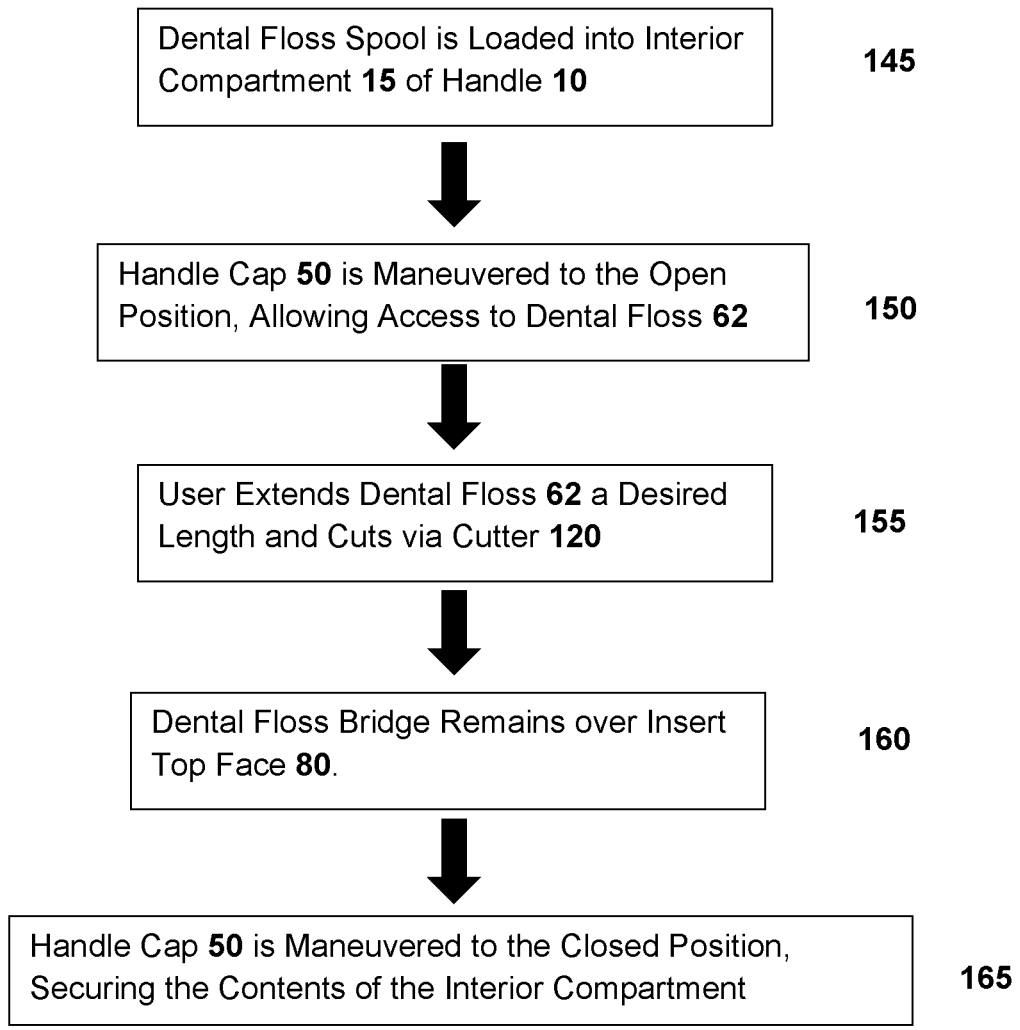
FIG. 10 is a schematic illustrating one method of using a manual toothbrush in accordance with some embodiments of the presently disclosed subject matter.

In use, brush head 30 can be used at any desired to time to brush a user's teeth. When the user desires to floss their teeth, a dental floss spool is inserted into the interior compartment of toothbrush 5, such that bore 55 is positioned within the spool internal passageway, as set forth in step 145 of the schematic of FIG. 10. In some embodiments, a spool of dental floss can be purchased separately from toothbrush 5 and inserted manually by the user (e.g., opening cap 50, removing platform insert 60, and positioning the spool over bore 55). In other embodiments, the toothbrush can be purchased with dental floss spool 61 already provided in interior compartment 15. The dental floss includes one free end that extends through housing opening 116 of platform insert top platform insert first face 80.

Figure 11:
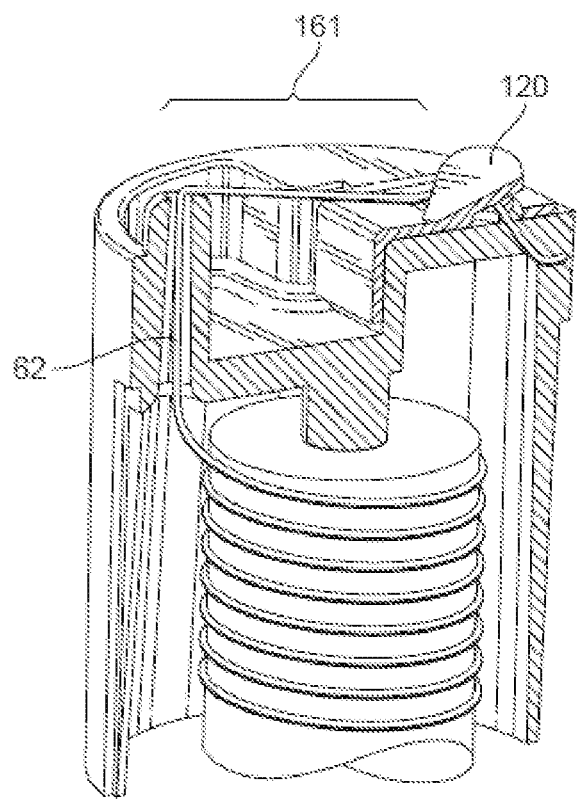
FIG. 11 is a cross-sectional view of dental floss extending through a platform insert in accordance with some embodiments of the presently disclosed subject matter.

At step 150, cap 50 positioned at proximal end 41 of handle 10 is maneuvered to an open position, allowing the user access to the first face of platform insert 60. The user can easily grasp a first end of dental floss 62 that extends from opening 116 due to the combination of the housing height and depression present on the top face of the platform insert. Particularly, the distance between the base (lowest portion) of the depression and the top portion of the housing (where the housing opening is located) is sufficient to allow a user's fingers to easily grasp the dental floss. The user then extends the dental floss a desired length, unwinding the dental floss from spool 61 and cuts the dental floss at cutter 120 at step 155. The free end of the dental floss remains at the cutter, thereby forming dental floss bridge 161 above the platform insert depression at step 160, shown in FIG. 11.

When the user has cut a strand of dental floss, cap 50 can then be rotated to the closed position, securing the dental floss and platform insert within the interior of the toothbrush handle at step 165. The toothbrush can then be stored until needing to be used again. Advantageously, because the platform insert, dental floss spool, etc. are positioned adjacent to cap 50, the toothbrush has a low center of gravity. Accordingly, the manual toothbrush can be easily and stably stored in an upright (e.g., vertical) orientation resting on the cap. No other manual toothbrush can be stored in this manner.

Once no more dental floss remains on spool 61, the entire toothbrush can be discarded and a new one purchased. Alternatively, the spool can be replaced by a user as described herein above.

Toothbrush 5 offers many advantages over conventional manual toothbrushes. For example, the disclosed toothbrush includes an interior compartment that houses dental floss. In this way, dental floss is always convenient and handy.

The disclosed toothbrush promotes healthy dental practices by combining the toothbrush and dental floss dispenser into a single unit, thereby encouraging users to both brush and floss regularly.

In addition, toothbrush 5 is simple in design and inexpensive to manufacture.

Toothbrush 5 is easy to use, allowing even children or the handicapped to easily use the dental floss and brush head to floss and brush their teeth.

Advantageously, the disclosed toothbrush allows for easy gripping and use of the dental floss, provided by depression 110 and the raised housing.

The disclosed toothbrush is durable and can safely come into contact with water.

Continuing, the dental floss compartment is unobtrusive when the user is brushing their teeth.

The angled head of the toothbrush allows water to easily move from the bristles, allowing the bristles to air dry.

Toothbrush 5 is configured such that a user can easily replace the dental floss spool when required.

As described above, although a preferred embodiment of the present invention has been described for illustrative purposes, those skilled in the art will appreciate that various modifications, additions, and substitutions are possible, without departing from the scope and spirit of the invention as disclosed in the accompanying claims.

What is claimed is:

1. A manual toothbrush comprising:
   a brush head comprising a first face and an opposed second face, wherein the first face is defined by a plurality of bristles;
   a handle defined by:
   a first end, a second end, and a body therebetween, wherein the first end of the handle is operably connected to the brush head and the second end of the handle comprises a removable cap having an extension positioned on an inside surface thereof;
   an interior compartment positioned within the inside of the body, wherein the interior compartment comprises a first end defined by a first protrusion that extends into the interior compartment and a second end that is adjacent to the removable cap, wherein one or more first ridges and a pair of second ridges are provided on an inner surface of the interior compartment, the one or more first ridges and the pair of second ridges being disposed at the second end of the interior compartment;
   a platform insert positioned within the interior compartment, the platform insert comprising:

a sidewall having one or more slits extending from a lower edge of the sidewall towards a top edge of the sidewall and a pair of openings positioned adjacent to the top edge of the sidewall and a pair of openings positioned adjacent to the top edge of the sidewall, wherein the slits are configured to engage the first ridges of the interior compartment, and the openings are configured to engage the second ridges of the interior compartment, wherein the sidewall has an open bottom forming an interior space in communication with the interior compartment; and a top wall extending from the top edge of the sidewall, the top wall comprising:

a top face having a cleft configured to house the extension of the cap, a depression, a housing protruding from a base of the depression, where the housing comprises a through aperture in communication with the interior compartment, and a cutting blade disposed adjacent to the top face and spaced apart from the base of the depression, wherein the housing has a height that extends 0.1-0.5 inches above the top face, and the depression spans about half of the top face; and a bottom face comprising a second protrusion that extends into the interior space of the platform insert, wherein the sidewall extends past the second protrusion;

a shaft having a first end engaged with the first protrusion and a second end engaged with the second protrusion, such that the shaft extends between the first and second protrusions within the interior compartment.

2. The manual toothbrush of claim 1, further comprising a spool wound with dental floss positioned about the shaft.

3. The manual toothbrush of claim 2, wherein the dental floss comprises an end that extends from the spool through the housing interior channel.

4. The manual toothbrush of claim 1, wherein the handle body comprises one or more concave thumb or finger rests.

5. The manual toothbrush of claim 1, wherein the removable cap is a flip cap that moves from a first position to a second position to allow access to the platform insert.

6. The manual toothbrush of claim 1, wherein the first and second ends of the shaft each comprise a cavity sized and shaped to accommodate the first or second protrusion.

7. The manual toothbrush of claim 1, wherein the brush head is angled relative to the handle.

8. The manual toothbrush of claim 2, wherein the spool comprises an interior passageway with a diameter that is greater than an external diameter of the shaft.

9. The manual toothbrush of claim 1, wherein the shaft is rotatable about the first and second protrusions.

10. The manual toothbrush of claim 1, wherein the cap includes an interior face adjacent to the interior compartment, wherein the interior face comprises an extension that cooperates with a cleft positioned on the top face of the platform insert.

11. The method of claim 1, wherein the height of the housing of the platform insert is 0.25-1 inch.

12. A method of flossing teeth, the method comprising: providing a manual toothbrush comprising:

a brush head comprising a first face and an opposed second face, wherein the first face is defined by a plurality of bristles;

a handle defined by:

a first end, a second end, and a body therebetween, wherein the first end of the handle is operably connected to the brush head and the second end of the handle comprises a removable cap having an extension positioned on an inside surface thereof;

an interior compartment positioned within the inside of the body, wherein the interior compartment comprises a first end defined by a first protrusion that extends into the interior compartment and a second end that is adjacent to the removable cap, wherein one or more first ridges and a pair of second ridges are provided on an inner surface of the interior compartment, the one or more first ridges and the pair of second ridges being disposed at the second end of the interior compartment;

a platform insert positioned within the interior compartment, the platform insert comprising:

a sidewall having one or more slits extending from a lower edge of the sidewall towards a top edge of the sidewall and a pair of openings positioned adjacent to the top edge of the sidewall and a pair of openings positioned adjacent to the top edge of the sidewall, wherein the slits are configured to engage the first ridges of the interior compartment, and the openings are configured to engage the second ridges of the interior compartment, wherein the sidewall has an open bottom forming an interior space in communication with the interior compartment; and a top wall extending from the top edge of the sidewall, the top wall comprising:

a top face having a cleft configured to house the extension of the cap, a depression, a housing protruding from a base of the depression, where the housing comprises a through aperture in communication with the interior compartment, and a cutting blade disposed adjacent to the top face and spaced apart from the base of the depression, wherein the housing has a height that extends 0.1-0.5 inches above the top face, and the depression spans about half of the top face; and a bottom face comprising a second protrusion that extends into the interior space of the platform insert, wherein the sidewall extends past the second protrusion;

a shaft having a first end engaged with the first protrusion and a second end engaged with the second protrusion, such that the shaft extends between the first and second protrusions with the interior compartment;

opening the cap to access the platform insert;

grasping a section of dental floss that extends from the housing of the platform insert housing;

pulling additional dental floss from the interior compartment, thereby unwinding the dental floss from a spool;

cutting a portion of dental floss using the cutting blade; and using the portion of dental floss to floss the teeth.

13. The method of claim 12, further comprising moving the cap to the closed position.

14. The method of claim 12, wherein the handle body comprises one or more concave thumb or finger rests.

15. The method of claim 12, wherein the first and second ends of the shaft each comprise a cavity sized and shaped to accommodate the first or second protrusion.

16. The method of claim 12, wherein the spool comprises an interior passageway with a diameter that is greater than an external diameter of the shaft.

17. The method of claim 12, wherein the brush head is angled relative to the handle.

18. The method of claim 12, wherein the height of the housing of the platform insert is 0.25-1 inch.

\* \* \* \* \*